Dec. 11, 1945.   R. C. McNEER   2,390,956
ANTISKID DEVICE
Filed June 24, 1944   2 Sheets-Sheet 1

Inventor
Roscoe C. McNeer,
By Stone, Boyden & Mack,
Attorneys

Dec. 11, 1945.  R. C. McNEER  2,390,956
ANTISKID DEVICE
Filed June 24, 1944  2 Sheets-Sheet 2

Inventor
Roscoe C. McNeer,
By Stone, Boyden & Mack,
Attorneys.

Patented Dec. 11, 1945

2,390,956

UNITED STATES PATENT OFFICE 2,390,956

ANTISKID DEVICE

Roscoe C. McNeer, Richmond, Va.

Application June 24, 1944, Serial No. 541,916

8 Claims. (Cl. 188—5)

This invention relates to anti-skid devices for vehicles, and more particularly for rubber tired motor vehicles.

As is well known, one of the greatest dangers to which motorists are subjected is the skidding or side slipping of an automobile on icy streets or highways. If the ice is hard and smooth, the usual tire chains afford but little protection against side slip.

The general object of the invention is to provide an attachment which may be applied to existing motor vehicles, and which will effectively prevent any side slip of the wheels when travelling over icy surfaces.

To this end, the invention contemplates the provision of a rotary circular blade or disk having a sharpened edge, and which may be brought into engagement with the ice, when desired.

In order that the invention may be readily understood, reference is had to the accompanying drawings forming part of this specification, and in which—

Figure 1:
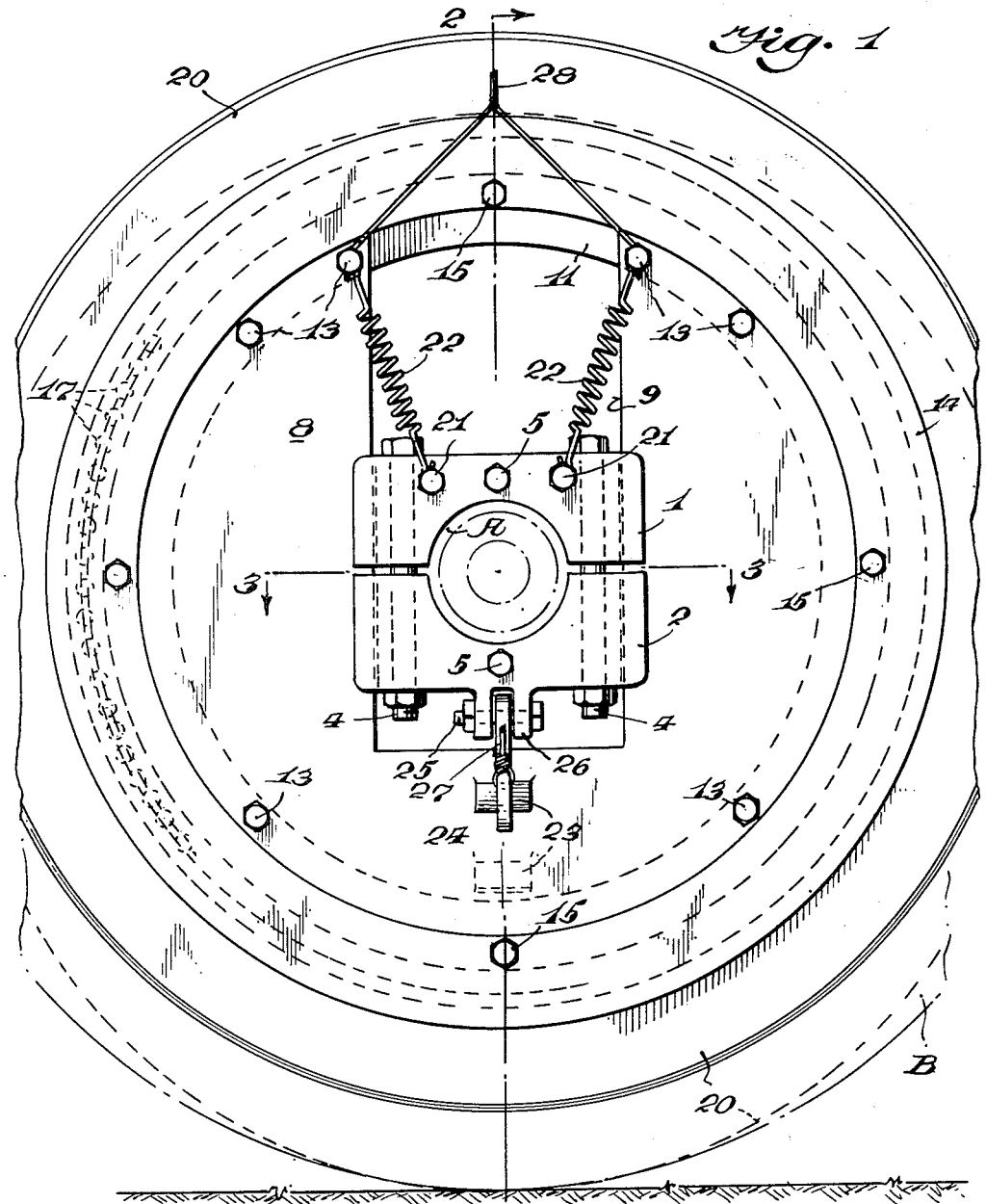
Fig. 1 is a view of my improved attachment, in elevation, looking toward the inside of one of the vehicle wheels.

Referring to the drawings in detail, the existing parts of an automobile are conventionally illustrated in broken lines, such parts including the rear axle housing A, a driving wheel B carrying the brake drum C, with which cooperates the customary brake drum backing plate D, which is rigidly secured to the axle housing A.

Figure 2:
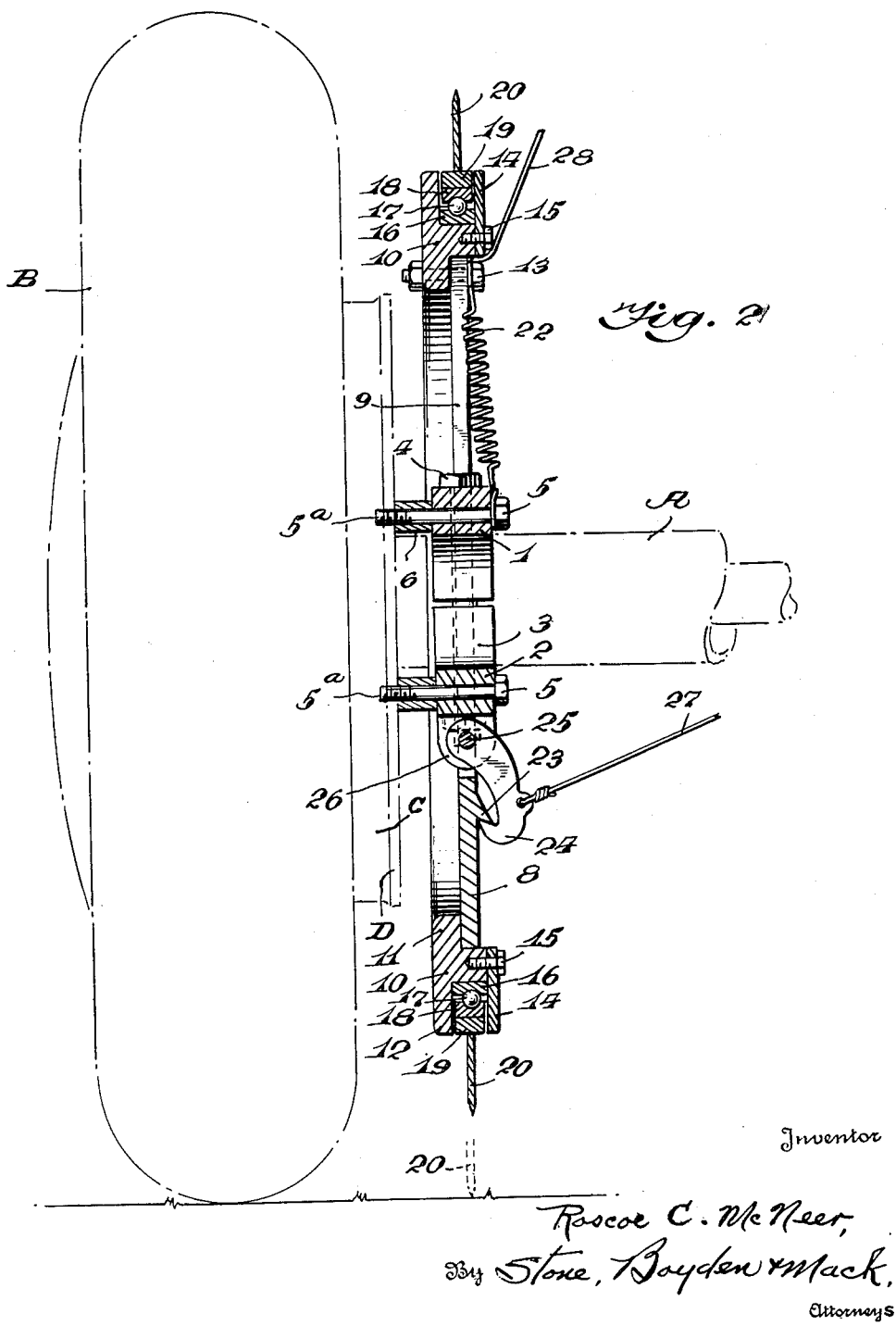
Fig. 2 is a transverse section on the line 2—2 of Fig. 1, looking in the direction of the arrows.

My improved attachment comprises a split block consisting of the halves 1 and 2, having concave central portions 3 adapted to surround the axial housing A, and clamped rigidly to such housing by means of bolts 4. As shown in Fig. 2, this block is mounted on the axle at a point adjacent the brake drum backing plate, and at a point between this plate and the usual spring (not shown). In order to still further secure the block in position, I preferably employ a pair of machine screws 5 passing through the members 1 and 2 of the block and having threaded ends 5ª which engage in tapped holes formed in the backing plate. Spacing sleeves 6 surround the bolts 5 and are interposed between the block and the backing plate.

Figure 3:
Fig. 3 is a fragmentary section on the line 3—3 of Fig. 1, looking in the direction of the arrows.

The block 1, 2, is provided with vertical grooves 7 in its side edges, as more clearly shown in Fig. 3, and in these grooves are slidably mounted the edges of a circular plate 8, having a rectangular notch or opening 9 formed therein, as clearly shown in Fig. 1. It will be seen that it is the vertical edges of this opening which are received and slide in the groove 7.

Surrounding and secured to the outer edges of this circular plate 8 is a ring 10, having an inwardly projecting flange 11 overlapping the outer edge of the plate. Bolts 13 pass through this flange and the plate, and thus rigidly secure the ring and plate together.

The ring 10 is also provided with a flange 12, projecting radially outward therefrom, and a removable flange or locking ring 14 is secured, as by screws 15, to the opposite side of the ring 10.

In the channel between the flanges 12 and 14 is mounted, with a tight frictional fit, an inner ball bearing raceway 16, and a series of balls 17 are confined between this raceway and an outer raceway 18.

Tightly surrounding the outer raceway 18, as by means of a shrunk-on fit, is another ring 19, this ring 19 being of approximately the same width as the outer raceway 18, and both 18 and 19 being slightly narrower than the channel in which they are mounted, so that they may run freely therein, on the ball bearings.

Surrounding and secured to the ring 19, as by welding, is a relatively thin annular blade or disk 20 having a sharpened outer edge, as shown in Fig. 2. This disk or blade is preferably in the nature of a rolling colter, such as has been used for many years in connection with plows.

The manner of assembling my improved antiskid device and attaching it to a motor vehicle will now be described. The essential thing is that the internal diameter of the flange 11 be slightly larger than the outside diameter of the backing plate D, so that, when the wheel is removed, the ring 10 and its associated parts may be slipped over the backing plate.

The split block 1, 2 is first applied to the axle, and the bolts 4 and 5 inserted and tightened. Then, the axle being suitably elevated, the plate 8 is moved vertically upward over the block, the edges 9 of the notch in the plate slidably engaging the grooves 7 in the side edges of the block. When this plate has been moved into position and properly centered with respect to the axle, and the wheel B removed, the ring 10, and the parts which it carries, are slipped over the backing plate until the flange 11 engages the plate 8, and the parts are then secured together by means of the bolts 13. The wheel may then be replaced.

In order to hold the blade 20 resiliently in contact with the icy roadway, I provide a pair of tension springs 22 attached at one end to the bolts 13 and at the other end to bolts 21 set into the block member 1.

It will be seen that the plate 8, together with the ring 10, constitute a circular frame and that the annular blade 20 is rotatably mounted on this frame. It will further be noted that the entire frame may move vertically relative to the axle, and that the annular blade 20, which thus surrounds the axle, is of smaller diameter than the vehicle wheels, so that, when centered with respect to the axle, it does not engage the roadway.

In order to hold the blade 20 normally out of contact with the roadway, I provide the plate 8 with a lug 23, adapted to be engaged by a hook 24, pivoted on a bolt 25, carried by lugs 26 projecting from the block member 2. A pull wire 27 is attached to this hook and extends to some point convenient to the driver.

When the driver encounters an icy surface, he pulls upon the wire 27, thus disengaging the hook 24 from the lug 23, and releasing the circular frame, thereby permitting the springs 22 to move this frame downwardly until the sharpened edge of the blade 20 engages the ice, as shown in dotted lines in Fig. 2. Then, as the vehicle travels, the blade 20 will roll along on the roadway, its sharpened edge cutting into the ice so as to effectively prevent any side slip. Moreover, owing to the springs 22, which resiliently hold the blade in operative position, should any obstacle be encountered, the blade can readily ride up and over it, the plate 8 sliding in the grooves 7 of the supporting block.

In order to restore the device to its normal or inoperative position, I preferably provide a second pull wire or rod 28, attached, for example, to the bolts 13, by means of which the device may be lifted until the lug 23 again engages the latch 24.

From the foregoing, it will be seen that I have provided an effective anti-skid device which is simple and rugged in construction, which may be applied to most existing types of motor vehicles, and which, while in no way interfering with the normal operation of the vehicle, is always ready to be brought into operative position when conditions require it.

What I claim is:

1. The combination with a vehicle having an axle and the usual brake drum backing plate secured thereto, of a block surrounding said axle, bolts passing through said block and engaging threaded openings in said backing plate, a circular frame mounted on said block for vertical sliding movement transversely of said axle, and an annular blade journalled on said frame and adapted to engage the roadway when said frame is moved downwardly.

2. An anti-skid attachment for motor vehicles having an axle and brake drum backing plate thereon, said attachment comprising a ring having an internal diameter larger than the diameter of said backing plate, whereby it may be passed over said backing plate, means for supporting said ring around said axle at a point on the inside of the backing plate, and an annular blade journalled on said ring and having a diameter smaller than that of the vehicle wheels.

3. An anti-skid attachment for motor vehicles having an axle and brake drum backing plate thereon, said attachment comprising a ring having an internal diameter larger than the diameter of said backing plate, whereby it may be passed over said backing plate, means for supporting said ring on said axle at a point on the inside of the backing plate, in such manner that it surrounds said axle and may move transversely thereof, and an annular blade rotatably mounted on said ring.

4. An anti-skid attachment for motor vehicles having an axle and brake drum backing plate thereon, said attachment comprising a ring having an internal diameter larger than the diameter of said backing plate, whereby it may be passed over said backing plate, means for supporting said ring on said axle at a point on the inside of the backing plate, in such manner that it surrounds said axle and may be raised and lowered with respect thereto, and an annular blade journalled on said ring and constructed to engage the roadway when said ring is lowered.

5. An anti-skid attachment for motor vehicles having an axle and brake drum backing plate thereon, said attachment comprising a ring having an internal diameter larger than the diameter of said backing plate, whereby it may be passed over said backing plate, means for supporting said ring on said axle at a point on the inside of the backing plate, in such manner that it surrounds said axle and may be raised and lowered with respect thereto, an annular blade journalled on said ring and constructed to engage the roadway when said ring is lowered, and means resiliently urging said ring toward its lowermost position.

6. An anti-skid attachment for motor vehicles comprising a split block, means for clamping said block to a vehicle axle, a circular frame slidably connected with said block for vertical movement with respect thereto, and an annular blade mounted for rotation on said circular frame and adapted to engage the roadway.

7. An anti-skid attachment for motor vehicles comprising a circular frame, means for supporting said frame on a vehicle axle for vertical movement with respect thereto, and an annular blade mounted for rotation on said circular frame and adapted to engage the roadway when said frame is lowered.

8. The combination with a vehicle having an axle, and wheels at the ends thereof, of a frame non-rotatably mounted on said axle at a point between said wheels and capable of being raised and lowered with respect thereto, and an annular blade surrounding said axle and journalled on said frame, said blade being normally out of contact with the roadway but constructed to engage the roadway when said frame is lowered.

ROSCOE C. McNEER.